United States Patent
Mitchell

(10) Patent No.: US 6,862,811 B2
(45) Date of Patent: Mar. 8, 2005

(54) AUTOMATIC LINE FEED DEVICE

(76) Inventor: James D. Mitchell, P.O. Box 56, Eden, NC (US) 27288

( * ) Notice: Subject to any disclaimer, the term of this patent is extended or adjusted under 35 U.S.C. 154(b) by 0 days.

(21) Appl. No.: 10/074,324

(22) Filed: Feb. 12, 2002

(65) Prior Publication Data

US 2002/0108258 A1 Aug. 15, 2002

Related U.S. Application Data

(60) Provisional application No. 60/268,240, filed on Feb. 12, 2001.

(51) Int. Cl.[7] .......................................... A01D 34/416
(52) U.S. Cl. ........................................ 30/276; 30/347
(58) Field of Search ..................... 30/276, 347; 56/12.7

(56) References Cited

U.S. PATENT DOCUMENTS

| | | | | |
|---|---|---|---|---|
| 4,035,912 A | * | 7/1977 | Ballas et al. ................... | 30/276 |
| 4,134,204 A | * | 1/1979 | Perdue .......................... | 30/276 |
| 4,211,005 A | * | 7/1980 | Woods .......................... | 30/276 |
| 4,285,128 A | | 8/1981 | Schnell et al. | |
| 4,524,515 A | | 6/1985 | Oberg | |
| 4,685,279 A | | 8/1987 | Gullett | |
| 5,027,591 A | * | 7/1991 | Nakamura et al. ............ | 30/276 |
| 5,657,542 A | | 8/1997 | White, III et al. | |

* cited by examiner

Primary Examiner—Hwei-Siu Payer
(74) Attorney, Agent, or Firm—Kimberly A. Chasteen

(57) ABSTRACT

A trimmer head for a line trimmer includes an automatic line feeding mechanism. The trimmer head accepts a spool of cutting line and spins extended line to trim, for example, unwanted vegetation in lawns. Upon actuation of the automatic line feeding mechanism, damaged or broken cutting line is replaced with additional cutting line from the spool. The mechanism is actuated remotely (electrically or manually) and eliminates the requirement to bump the trimmer head on the ground thus reducing wear and tear on the trimmer.

12 Claims, 2 Drawing Sheets

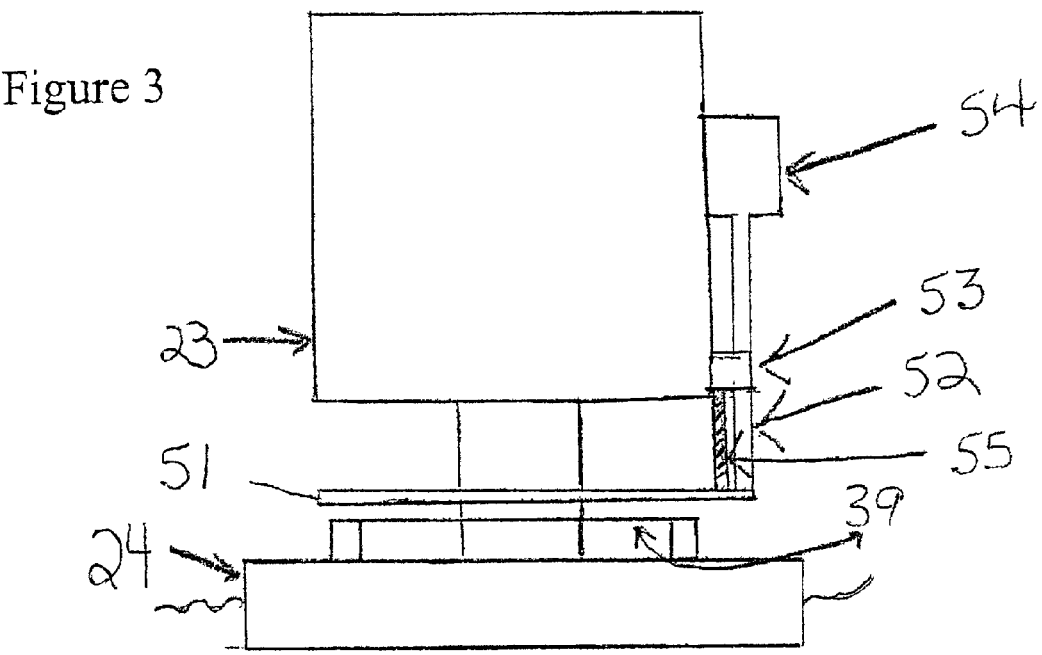
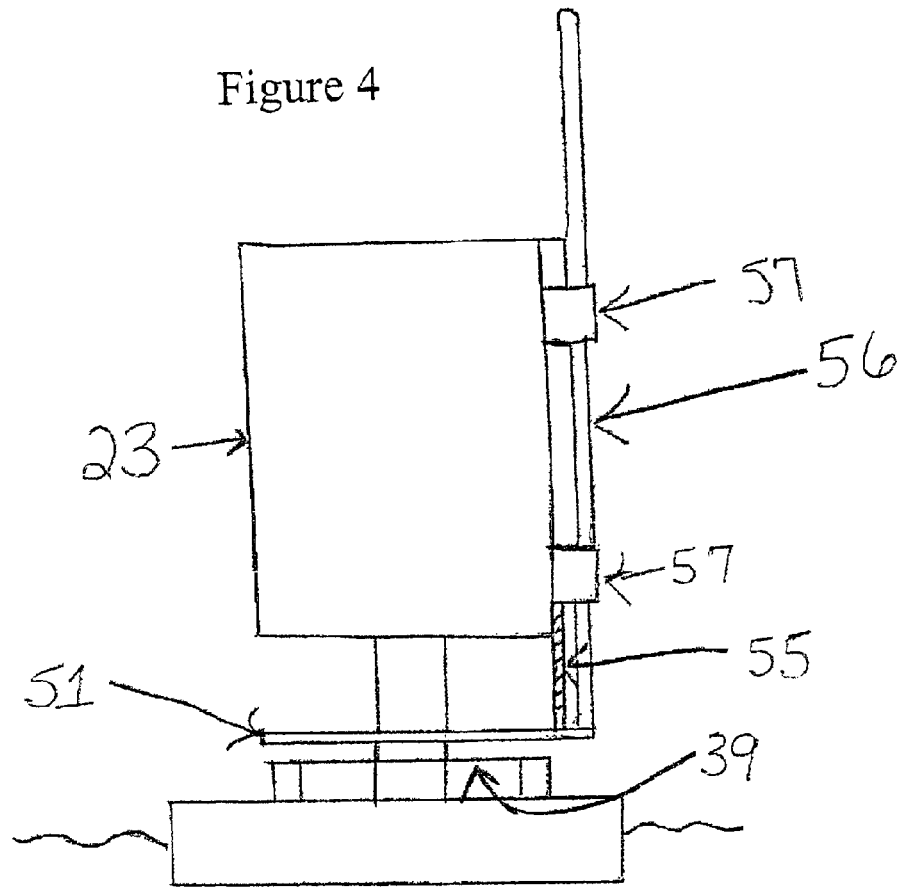

AUTOMATIC LINE FEED DEVICE

CROSS REFERENCE TO RELATED APPLICATION

The present application claims priority from U.S. Provisional Application Ser. No. 60/268,240 filed Feb. 12, 2001.

BACKGROUND OF THE INVENTION

The present invention relates to automatic line feed devices and more particularly to automatic line feed devices for lawn trimmers.

DESCRIPTION OF THE RELATED ART

Lawnmowers are currently unable to trim the edges of lawns or locations which are close to objects commonly found in or near lawns such as trees, fences, houses, mailboxes, etc. It is well known to use a separate device known as a trimmer or edger to complete the cutting of these troublesome areas once the lawn has been completely cut. Many of these devices use line which is spun rapidly to perform this trimming. This line is often damaged and requires replacement.

Previous methods for solving this problem are known. One such apparatus is shown in U.S. Pat. No. 4,285,128 which shows a spool feed mechanism for a line feed grass trimmer. This mechanism includes a spool of line located in the handle of the grass trimmer. Through movement of a trigger assembly, a predetermined length of line is fed from the spool, through the handle of the trimmer and down to the trimmer head. This device does not remotely advance the line.

Another type of line feed device for a trimmer head is shown in U.S. Pat. No. 5,657,542 and U.S. Pat. No. 4,524,515. These devices use the "ground bump" method for advancing line. When the user determines that additional line is required, they bounce the trimmer head on the ground which acts to dispense more line. This action may also damage the trimmer head. Further, accidental bumps can cause unneeded line to be dispensed which is wasteful.

Several other patents show trimmer heads having fixed lengths of line which are replaced when the line is damages. These include U.S. Pat. No. 4,685,279; U.S. Pat. No. 5,197,264; U.S. Pat. No. 5,433,006; U.S. Pat. No. 5,758,424; U.S. Pat. No. 5,836,227; U.S. Pat. No. 5,887,348; U.S. Pat. No. 5,896,666; U.S. Pat. No. 5,979,064; U.S. Pat. No. 5,987,756; U.S. Pat. No. 6,032,442; U.S. Pat. No. 6,108,914. These devices have a major deficiency in that it is time consuming to stop operation of the trimmer to completely replace the damaged line.

SUMMARY OF THE INVENTION

A trimmer attachment assembly for a lawn maintenance vehicle is described. The trimmer head includes a housing for a spool of cutting line. When placed inside the housing, the spool is forced towards the top of the housing by a spring or other similar device. The top of the spool includes mechanical members, such as teeth, which engage with mechanical members on the inner surface of the top of the spool housing. In normal operation, the spool housing is rotated and, because the spool is forced towards the top of the housing, the spool spins as well. Through use, the line can become damage or torn, requiring additional line to be dispensed from the spool. To accomplish this, the spool must be forced downward, away from the top of the spool housing. One mechanism for this includes a lower ring located within the spool housing between the spool and the inner surface of the top of the spool housing and an upper ring located on top of the spool housing. The two rings are rigidly connected by, for example, pins which extend through the top of the spool housing. Thus, the spring in the spool housing normally acts to push the upper ring away from the top surface of the spool housing. To overcome the spring and allow the spool to move downward, pressure is applied to the upper ring which acts through the rigid connection with the lower ring to push the spool downwards within the spool housing, thus disengaging the mechanical members on the spool from the mechanical members on the spool housing. This pressure can be applied by a mechanical or electrical rod which is actuated remotely by the trimmer operator. A preferred embodiment includes an element such as a spring to bias the rod away from the upper ring to ensure that cutting line is not dispensed when not needed. Additionally, to ensure complete contact with the upper ring, the rod may contact the upper ring through a contact plate attached to the end of the rod. This design can be used in conjunction with electrical or hydraulic motors.

An object of the invention is to provide an automatic line feed device.

Another object of the invention is to provide an automatic line feed device for lawn trimmers.

Another object of the invention is to provide an automatic line feed device for a lawn trimmer head which allows for remote actuation.

Yet another object of the invention is to provide an automatic line feed mechanism for a trimmer head which does not require the trimmer head to be bumped against the ground.

A further object of the invention is to provide an automatic line feed device which is inexpensive to manufacture.

Finally, it is an object of the present invention to accomplish the foregoing objectives in a simple and cost effective manner.

BRIEF DESCRIPTION OF THE DRAWINGS

FIG. 3 is a side view of the motorized trimming means of the present invention which includes the capability of remote operation of the self-feeding head.

FIG. 4 is a side view of the motorized trimming means of the present invention which includes the capability of manual automatic operation of the feeding head.

Figure 1:
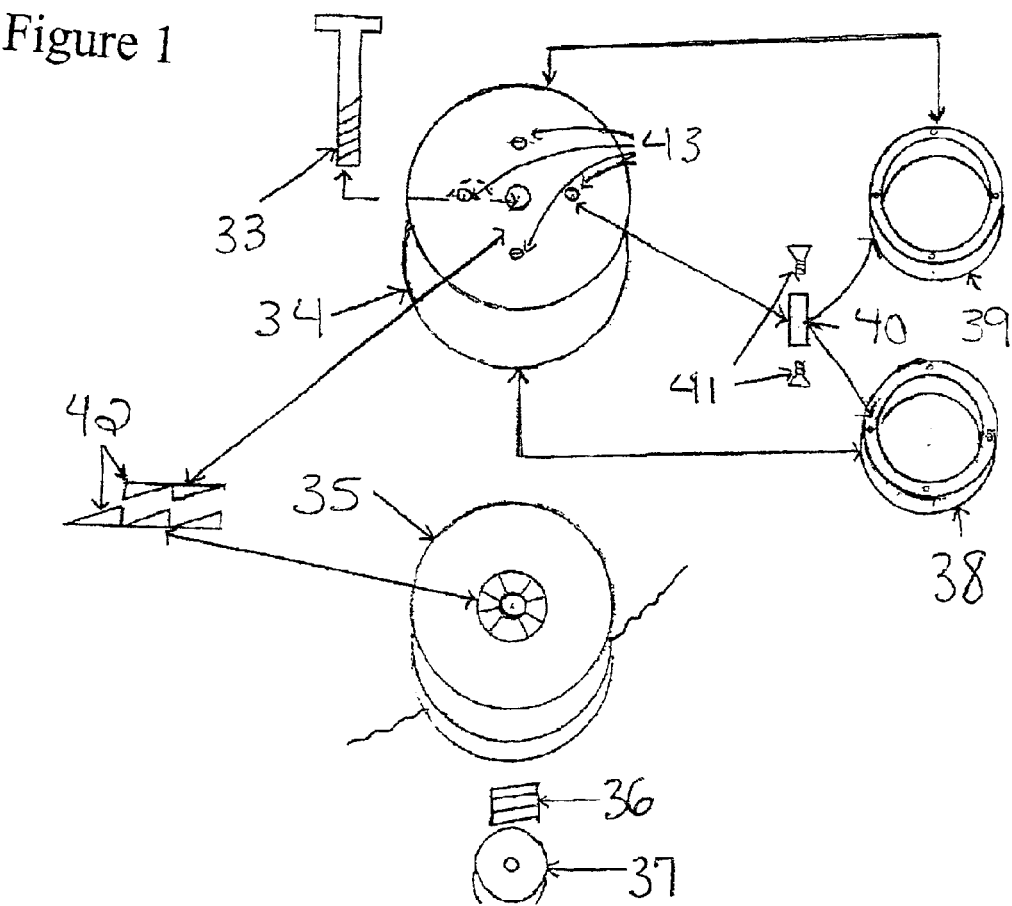
FIG. 1 is an exploded view of the self-feeding head of the present invention.

ELEMENT LIST 23 motor
24 trimming means
33 shaft bolt
34 spool housing
35 spool
36 spring
37 retaining nut
38 bottom ring
39 top ring
40 connecting stud
41 screws
42 teeth
43 holes
51 striking plate 52 shaft
53 shaft guide
54 solenoid
55 spring
56 automatic feed rod
57 automatic feed rod guide

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating general principles of embodiments of the invention. Specifically, alternate activation methods and alternate trimmer types are contemplated and considered to be within the scope of the claims set forth herein.

Referring to FIGS. 1–4, a preferred embodiment of the present invention is shown generally by the numbers 23 and 24. FIG. 1 shows one possible assembly for remotely feeding line from a trimming apparatus which makes use of feedable line for trimming. Because the operator of a lawn trimmer is located remote from the motorized trimming apparatus 23 and 24, it is preferable to design the trimmer 24 such that the line can be fed from a remote location. In this design, the trimming apparatus 24 consists of a spool housing 34, a spool 35, a top ring 39, a bottom ring 38 and a center shaft bolt 33. The spool 35 is placed inside the spool housing 34. The top ring 39, bottom ring 38 and upper surface of the spool housing 34 include a matching set of holes 43. A connecting stud 40 is placed in each hole 43 of the bottom ring 38 and a screw 41 is placed in each connecting stud 40. The bottom ring 38 is then placed on top of the spool 35 such that the connecting studs 40 extend through the bottom ring 38 and away from the spool 35 and such that the connecting studs 40 extends through the holes 43 in the upper surface of the spool housing 34. The holes 43 in the top ring 39 are then aligned with the connecting studs 40 and screws 41 are used to maintain the top ring 39 on the connecting studs 40. The center shaft bolt 33 then extends through the center of the top ring 39, a hole in the center of upper surface of the spool housing 34, the center of the bottom ring 38, the center of the spool 35 and then through a spring 36 and a retaining nut 37.

Figure 2:
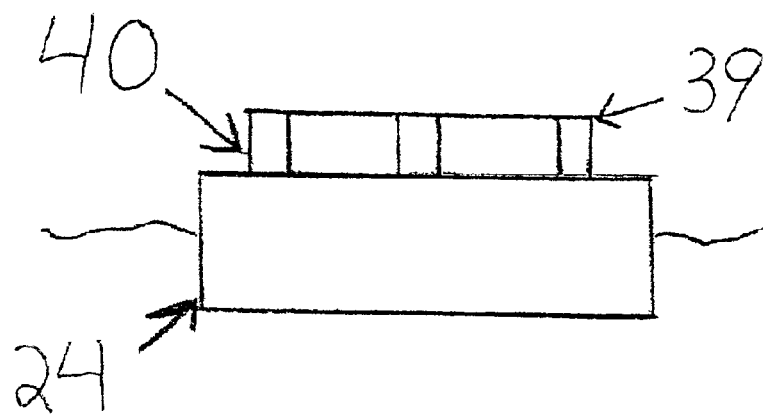
FIG. 2 is a side view of automatic feeding head of the present invention.

FIG. 2 shows the assembled trimming means 24. The spool 35 is driven by two sets of meshing teeth 42 which are located on the inner surface of the spool housing 34 and the upper surface of the spool 35. In normal operation, the spring 36 biases the spool 35 up such that the sets of teeth 42 mesh. In order to feed additional line, the top ring 39 is struck which in turn forces the spool 35 downward such that the sets of teeth 42 disengage which allows additional line to feed.

FIGS. 3 and 4 show possible mechanisms for accomplishing the line feed remotely. FIG. 3 shows one embodiment of an apparatus for remotely actuating the line feed device to feed additional line to the motorized trimming means 24. A striking plate 51 is connected to a shaft 52 which connects to a solenoid 54. A shaft guide 53 guides the support shaft 52. A spring 55 is attached to the striking plate 51 on one end and to the shaft guide 53 on the other end. The purpose of the spring 55 is to keep the striking plate 51 and the top ring 39 from making constant contact while running. Actuating the solenoid 54 causes the striking plate 51 to come into contact with the top ring 39 allowing string to feed out. The solenoid 54 is preferably operated by a switch mounted on the trimmer within easy access of the operator.

FIG. 4 shows another embodiment of an apparatus for remotely actuating the line feed device to feed additional line to the motorized trimming means 24. A striking plate 51 is connected to a rod 56 which is long enough so that it can be easily reached by the trimmer operator. Two rod guides 57 guide the rod 56. A spring 55 is attached to the striking plate 51 on one end and to the lower rod guide 57 on the other end. The purpose of the spring 55 is to keep the striking plate 51 and the top ring 39 from making constant contact while running. To operate the apparatus, the trimmer operator strikes the rod 56 with a quick tap and release, which causes the striking plate 51 to come into contact with the top ring 39 allowing string to feed out.

Many improvements, modifications, and additions will be apparent to the skilled artisan without departing from the spirit and scope of the present invention as described herein and defined in the following claims.

What is claimed is:

1. A line trimmer head for a motorized trimmer, comprising:
   a spool housing for housing a spool of cutting line; the inner surface of the top of the spool housing having driving teeth which engage with driving teeth located in the upper surface of the spool;
   a bottom ring located within the spool housing on top of the spool;
   a top ring located on top of the spool housing and connected to the bottom ring by a plurality of rigid pins extending through the top of the spool housing;
   a spring for biasing the spool towards the inner surface of the top of the spool housing;
   a motor for spinning the spool housing such that the teeth in the spool housing engage the teeth in the spool to spin the spool of cutting line; and
   a rod which is remotely electrically actuated to force the top ring and attached bottom ring downwards forcing the spool against the bias of the spring and temporarily disengages the driving teeth on the spool housing from the driving teeth on the spool.

2. The line trimmer head as set forth in claim 1 further comprising a rod biasing means for biasing the rod away from the top of the spool housing.

3. The line trimmer head as set forth in claim 2 wherein the biasing means is a spring.

4. The line trimmer head as set forth in claim 1 wherein the rod further includes a striking plate which acts to force the top ring downwards when the rod is actuated.

5. A line trimmer head for a motorized trimmer, comprising:
   a spool housing for housing a spool of cutting line; the inner surface of the top of the spool housing having driving teeth which engage with driving teeth located in the upper surface of the spool;
   a bottom ring located within the spool housing on top of the spool;
   a top ring located on top of the spool housing and connected to the bottom ring by a plurality of rigid pins extending through the top of the spool housing;
   a spring for biasing the spool towards the inner surface of the top of the spool housing;
   a motor for spinning the spool housing such that the teeth in the spool housing engage the teeth in the spool to spin the spool of cutting line; and
   a rod which is remotely manually actuated to force the top ring and attached bottom ring downwards forcing the spool against the bias of the spring and temporarily disengages the driving teeth on the spool housing from the driving teeth on the spool.

6. The line trimmer head as set forth in claim 5 further comprising a rod biasing means for biasing the rod away from the top of the spool housing.

7. The line trimmer head as set forth in claim 6 wherein the biasing means is a spring.

8. The line trimmer head as set forth in claim 5 wherein the rod further includes a striking plate which acts to force the top ring downwards when the rod is actuated.

9. A line trimmer head for a motorized trimmer, comprising:
   a spool housing for housing a spool of cutting line, wherein the inner surface of the top of the spool housing includes teeth which engage with teeth on the top of the spool such that spinning means for spinning the spool housing causes the spool to spin in conjunction with the spool housing;
   biasing means for biasing the spool towards the top of the spool housing; and
   forcing means for forcing the spool towards the bottom of the spool housing against the biasing means in order to automatically feed line from the spool of cutting line.

10. A line trimmer head for a motorized trimmer, comprising:
    a spool housing for housing a spool of cutting line;
    biasing means for biasing the spool towards the top of the spool housing;
    forcing means for forcing the spool towards the bottom of the spool housing against the biasing means wherein the forcing means comprises:
      a bottom ring located within the spool housing on top of the spool;
      a top ring located on top of the spool housing and connected to the bottom ring by a plurality of rigid pins extending through the top of the spool housing; and
      pushing means for pushing the top ring and attached bottom ring downwards forcing the spool against the bias of the biasing means; and
    spinning means for spinning the spool housing.

11. The line trimmer head as set forth in claim 10 wherein the pushing means comprises a manually actuated rod.

12. The line trimmer head as set forth in claim 10 wherein the pushing means comprises an electrically actuated rod.

* * * * *